US009864588B2

(12) United States Patent
Avadhanula et al.

(10) Patent No.: US 9,864,588 B2
(45) Date of Patent: Jan. 9, 2018

(54) CANONICALIZED VERSIONS OF REUSE CANDIDATES IN GRAPHICAL STATE DIAGRAMS

(75) Inventors: Srinath Avadhanula, Waltham, MA (US); Vijay Raghavan, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 797 days.

(21) Appl. No.: 12/964,371

(22) Filed: Dec. 9, 2010

(65) Prior Publication Data

US 2011/0137634 A1    Jun. 9, 2011

Related U.S. Application Data

(60) Provisional application No. 61/267,885, filed on Dec. 9, 2009.

(51) Int. Cl.
*G06F 17/50* (2006.01)
*G06F 9/44* (2006.01)

(52) U.S. Cl.
CPC ............. *G06F 8/36* (2013.01); *G06F 8/10* (2013.01); *G06F 8/34* (2013.01)

(58) Field of Classification Search
CPC ........................................... G06F 8/36
USPC ............................................ 703/13
See application file for complete search history.

(56) References Cited

U.S. PATENT DOCUMENTS

| | | | |
|---|---|---|---|
| 5,699,507 A | 12/1997 | Goodnow, II et al. | |
| 7,246,056 B1 * | 7/2007 | Brewton | G06F 17/5009 703/20 |
| 7,420,573 B1 * | 9/2008 | Aberg | G06T 11/206 345/630 |
| 2006/0190105 A1 * | 8/2006 | Hsu | G06F 8/34 700/86 |
| 2007/0074184 A1 * | 3/2007 | Raghavan | G06F 8/34 717/138 |

(Continued)

FOREIGN PATENT DOCUMENTS

| | | |
|---|---|---|
| EP | 1662381 A1 | 5/2006 |
| JP | 3-80327 | 4/1991 |
| JP | 7-219759 | 8/1995 |

(Continued)

OTHER PUBLICATIONS

Michele Banci et al., "Statecharts composition to model topologically distributed applications," 2006, Journal of Integrated Design and Process Science, vol. 10, No. 1, pp. 1-15.*

(Continued)

*Primary Examiner* — Kamini S Shah
*Assistant Examiner* — Russ Guill
(74) *Attorney, Agent, or Firm* — Nelson Mullins Riley & Scarborough LLP

(57) ABSTRACT

Exemplary embodiments provide techniques for replacing a portion of a state diagram with a generalized, canonical version of the portion. The canonicalized version mimics the structure or semantics (or both) of the portion of the state diagram, although the canonicalized version need not be a perfect match for the structure or semantics of the portion. Exemplary embodiments further provide techniques for identifying a portion of a state diagram for reuse, and generating a canonicalized version of the portion.

18 Claims, 9 Drawing Sheets

(56) References Cited

U.S. PATENT DOCUMENTS

2008/0263512 A1    10/2008    Dellas et al.

FOREIGN PATENT DOCUMENTS

| JP | 8-241193 | 9/1996 |
|---|---|---|
| JP | 8-263299 | 10/1996 |
| JP | 11-85824 | 3/1999 |
| JP | 2001-125793 | 5/2001 |
| JP | 2004-502234 | 1/2004 |
| JP | 2005-122452 | 5/2005 |
| JP | 2006-92161 | 4/2006 |
| JP | 2006-351023 | 12/2006 |
| WO | 07/027622 A2 | 3/2007 |

OTHER PUBLICATIONS

"Stateflow and Stateflow Coder," Version 5, 2003, The MathWorks, 896 pages.*
Rainer Leupers et al., "Function inlining under code size constraints for embedded processors," 1999, IEEE International Conference on Computer-Aided Design, pp. 253-256.*
Raghu Reddy et al., "Model composition—a signature-based approach," 2005, Aspect Oriented Moeling Workshop at Models 20005, seven pages.*
N.L. Vijaykumar et al., "Handling with parameterized states in Statecharts for determining performance measurements of reactive systems," 2001, Proceedings of the VII International Conference on Industrial Engineering and Operations Management, 13 pages.*
Franck Fleurey et al., "A generic approach for automatic model composition," 2008, MoDELS 2007 Workshops, Springer-Verlag, pp. 7-15.*
Kleinner S.F. Oliveira et al., "A guidance for model composition," 2007, International Conference on Software Engineering Advances, six pages.*
Udo Kelter et al. "Comparing state machines," 2008, Comparison and Versioning of Models 2008, pp. 1-6.*
Kirill Bogdanov et al., "Computing the structural difference between state-based models," 2009, 16th Working Conference on Reverse Engineering, pp. 177-186.*
N.H. Pham et al., "Complete and accurate clone detection in graph-based models," May 2009, IEEE 31st International Conference on Software Engineering, pp. 276-286.*
Lingxiao Jiang et al., "Deckard: Scalable and accurate tree-based detection of code clones," 2007, Proceedings of the 29th international conference on Software Engineering, ten pages.*
Stephane Ducasse et al., "A language independent approach for detecting duplicated code," 1999, IEEE International Conference on Software Maintenance, ten pages.*
Martin Fowler, "Refactoring Improving the Design of Existing Code," 1999, Addison-Wesley, pp. 283-284.*
Daniel Arsenovski, "Professional refactoring in Visual Basic," 2008, Wiley Publishing, Inc., pp. 229-235.*
Hassan Gomaa, "Designing Software Prtoduct Lines with UML," 2005, Addison-Wesley, pp. 117-135.*
"Stateflow and Stateflow Coder," version 5, 2003, The Mathworks, Inc., 896 pages.*
Yoshiki Higo et al., "On refactoring for open source Java program," 2003, 2003 Proceedings: Australian Conference on Software Measurement(vol. 2 of the Proceedings), five pages.*
Brenda S. Baker, "On finding duplication and near-duplication in large software systems," 1995, Proceedings of the Second Working Conference on Reverse Engineering, pp. 86-95.*
Mehrdad Sabetzadeh et al., "A relationship-driven framework for model merging," 2007, IEEE International Workshop on Modeling in Software Engineering, six pages.*
"Using Simulink," 2005, The Mathworks, 711 pages.*
Kishi, Mihoko et al., "A program synthesis system based on state transition model," Research Report, The Information Processing Society of Japan, vol. 91(66):167-174 (1991).
Japanese Office Action for Application No. 2012-543283, 10 pages, dated Oct. 8, 2013.
Written Opinion for Application No. PCT/US2010/059716, dated Feb. 23, 2012.
Nejati, Shiva et al., "Matching and Merging of Statecharts Specifications," 29th International Conference on Software Engineering (ICSE'07) pp. 54-64 (2007).
Sane, Aamod et al., "Object-Oriented State Machines: Subclassing, Composition, Delegation, and Genericity," ACM Sigplan Notices, vol. 30(10):17-32 (1995).
International Search Report and Written Opinion for Application No. PCT/2010/059716, dated Mar. 31, 2011.
European Office Action for Application No. 10798416.3, 7 pages, dated Apr. 23, 2013.

* cited by examiner

CANONICALIZED VERSIONS OF REUSE CANDIDATES IN GRAPHICAL STATE DIAGRAMS

RELATED APPLICATIONS

This application claims priority to U.S. Provisional Application No. 61/267,885, filed on Dec. 9, 2009. The content of the aforementioned application is incorporated herein by reference.

BACKGROUND

State diagram modeling environments provide tools that allow users to build and simulate models including graphical representations of state machines. These models are useful in a number of contexts, such as when a modeled entity is responsive to one or more events. Conventional state diagram modeling environments suffer from a number of limitations. For example, conventional state diagrams can grow large and unwieldy, and thus may become difficult to edit and/or debug. Further, it may be difficult to reuse components from a first part of a state diagram model into a second part of a state diagram model (or in a different state diagram model).

SUMMARY

In some embodiments, a state diagram model may be provided, for example in a state diagram environment. The state diagram model may be, for example, a graphical state diagram which represents a model of a hierarchical state machine.

Two or more reuse candidates may be identified in the model, where each reuse candidate can be made up of at least one element of the state diagram model. The number, containment, and connectedness of elements making up the reuse candidate may describe a structure of the reuse candidate. For example, each reuse candidate may include a state and a hierarchy for the state. Hierarchies for states may include zero or more child states, zero or more child transitions, and zero or more child junctions.

A canonicalized version of the reuse candidates may be used in place of the two or more reuse candidates; for example, the canonicalized version may replace the reuse candidates in the model. A canonical or canonicalized version of a reuse candidate is a standard or normal representation of the structure and/or semantics reuse candidate, which may have some of the semantic details of the reuse candidate abstracted away. The canonicalized version may have a generalized structure for representing the structure of the reuse candidate. For example, the canonicalized version of the reuse candidates may include a placeholder state representing the states of the reuse candidates, zero or more placeholder child states representing the zero or more child states of the reuse candidates, zero or more placeholder child transitions representing the zero or more child transitions of the reuse candidates, and zero or more placeholder child junctions representing the zero or more child junctions of the reuse candidates.

In some embodiments, the two or more reuse candidates may be structurally non-identical. Accordingly, the canonicalized version may represent a union of the structurally non-identical reuse candidates.

The two or more reuse candidates may be identified by determining a similarity metric representing the similarity between two reuse candidates. For example, a reuse signature may be assigned to two or more states of the graphical state diagram, and a Hamming distance may be determined for a pair of states among the two or more states. Two or more reuse candidates may be selected if the two or more reuse candidates have a Hamming distance that is less than or equal to a predefined threshold.

The canonicalized version may replace names, variables, and constants (among other elements) of the reuse candidates with canonicalized versions of the names, variables, and constants. For example, if the reuse candidates have names, the canonicalized version of the reuse candidates may include reuse candidate symbols in place of the reuse candidate names. Two reuse candidates may be assigned the same symbol if the two reuse candidates are semantically equivalent.

Similarly, if the reuse candidates include one or more variables or constants, the canonicalized version may include canonicalized variables or constants. In order to represent the variables and constants of each reuse candidate with a canonicalized version of the variables and constants, a parameterized link may be provided between the reuse candidate and the canonicalized version. The link may be parameterized such that the link provides semantic information related to the reuse candidate. When the link is activated in the model, the canonicalized versions of the variables and constants may be replaced by appropriate versions of the variables and constants from the reuse candidates.

The canonicalized version of the reuse candidates may be represented by an atomic subchart that represents a unified state diagram of the canonicalized version. In order to use the canonicalized version, the reuse candidate may be replaced by an instance of the atomic subchart in the state diagram model.

Furthermore, code may be generated from the graphical state diagram model. If one or more of the reuse candidates or the canonicalized version is changed and the code is regenerated, new code may be generated for only the changed reuse candidate or canonicalized version, rather than for the entire model.

In some embodiments, the canonicalized version is stored in a storage, such as a repository or library. In some embodiments, the canonicalized version may be generated when the canonicalized version is requested for a procedure (for example, when a user wishes to replace one or more reuse candidates with a canonicalized version, or when code is generated for the model).

In some embodiments, a preview of the canonicalized version may be provided. This preview may be presented to the user without replacing the reuse candidates with the canonicalized version. Changes to this preview may be made by the user such as indicating desired or undesired canonical properties (e.g., undesired elements that result from the union of structurally non-identical candidates).

In order to generate the canonicalized version of a portion of a graphical state diagram, this portion may be selected. The structure and/or semantics of the portion may be determined, where the structure may be described by one or more states or transitions, the containment of states, and the connectedness of the states and/or transitions. The semantics may be represented by parameters within the portion and/or referenced by the portion, such as variables and/or constants. Respective canonical versions of the variables or constants of the reuse candidates may be generated for the canonicalized version. Further, the canonicalized version of the portion may have a structure that is the same as the structure of the portion. Alternatively, the structure of the canonicalized version may be non-identical to the structure of the portion.

For example, the canonicalized version may represent a union of different structures. One or more instructions for using a particular type of structure may be stored with the canonicalized version in a storage.

In order to prevent small or trivial canonicalized versions from being generated, a predetermined threshold size, value, range, etc., may be defined. When the portion of the graphical state diagram is selected, the size of the portion may be compared to the predetermined threshold size. The portion may be canonicalized depending on if the size of the portion is greater than or equal to the predetermined threshold size. Furthermore, a signature for the canonicalized version may be determined, and the signature may be stored with the canonicalized version.

Exemplary embodiments may be embodied as a method operable in an electronic device, such as a computer. Embodiments may further be embodied in one or more nontransitory electronic device readable media storing instructions that, when executed by one or more processors, cause the processors to carry out a method. Furthermore, embodiments may be represented in a system comprising a processor programmed to execute instructions for carrying out a method.

DETAILED DESCRIPTION

Figure 1:
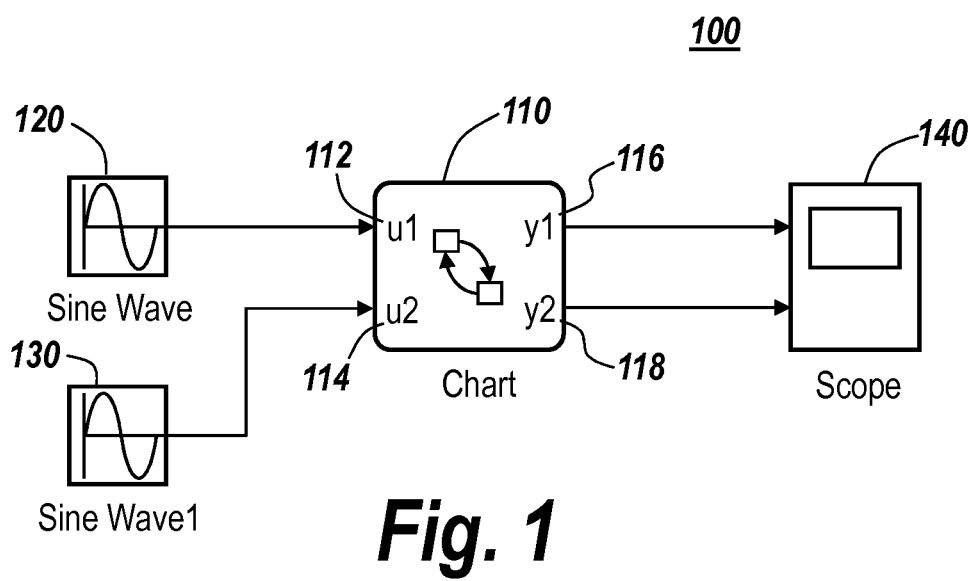
FIG. 1 depicts an example of a block diagram incorporating a statechart suitable for use with exemplary embodiments.

Exemplary embodiments provide techniques for replacing a portion of a state diagram (or the entirety of the state diagram) with a canonicalized version. A canonicalized version may be, for example, a generalized version of the portion of the state diagram, with details of the semantics replaced by canonicalized parameters. Exemplary embodiments further provide techniques for identifying a portion of a state diagram for reuse, and generating a canonicalized version of the portion.

The portion or the state diagram to be replaced is referred to herein as a "reuse candidate." A canonical or canonicalized version of a reuse candidate is a standard or normal representation of the structure and/or semantics of a reuse candidate. A canonicalized version of a reuse candidate is capable of representing the reuse candidate, although some of the details of the structure and/or semantics of the reuse candidate may be abstracted away in the canonicalized version. In some embodiments, the canonicalized version of the reuse candidate may be provided with a parameterized link that allows the details of the structure and/or semantics of the reuse candidate to be reintroduced to the canonicalized version when the structure and/or semantic details are used or referenced in the state diagram. The canonicalized version mimics the structure and/or semantics of the portion of the state diagram, although the canonicalized version need not be a perfect match for the structure or semantics of the portion.

Using the canonicalized versions, identical or similar parts of state diagrams may be reused. Accordingly, the model may be simplified and easier to edit and debug. Further, a user may edit the canonicalized version once, and have the changes automatically reflected in the portions of the model implemented based on the canonicalized portions. Code generation based on the model may be simplified, since portions of the model based on the canonicalized version may share common code characteristics. Further, if the canonicalized version (or a portion of the model based on the canonicalized version) is changed, then only the code for the canonicalized portion may have to be regenerated.

As noted above, the canonicalized version may be used in a state diagram, which may be designed in graphical modeling environments. In some cases, the graphical modeling environment may enable a graphical model to be executed or simulated.

Graphical models, such as graphical state diagram models (sometimes referred to as "statecharts"), may include one or more graphical elements. Together the graphical elements may represent a dynamic system, which is a system whose behaviors progressively change, for example over time. These elements may include one or more nodes, which may be connected by one or more lines (or, in some cases, a node may be connected to a line which is not itself connected to another node, as shown, for example, in FIGS. 2A and 3A). Some or all nodes and lines in a graphical state diagram model may react to one or more events, which may occur in a system represented by the model. The nodes may represent, for example, one or more states in the system, and the lines (sometimes represented as arrows) may represent, for example, one or more transitions between states in the system.

Each state may represent an action that may be performed on an entity. Moreover, a state in a discrete-event system such as a graphical state diagram model may represent a mode of the discrete event-driven system. A state may be (1) a part of a finite state machine or (2) a statechart that may represent a finite state machine. Lines in the statechart may represent transitions between the states by which activity status transfers from node to node. States or statecharts may be embedded and/or referenced in block diagram models such as time-based block diagram models.

Elements in a statechart, including states, transitions, and junctions, may be represented in a source model language and stored in a model file. Each element may be represented, for example, as an object. In some embodiments, each element may be designated by a type (e.g., state, transition, or junction), followed by details that provide a description of the structure and semantics of the element. For example, states may be provided with an identifier, hierarchy information (such as the identity of any parent or child states), information identifying which chart the state belongs in (for example, if the model is made up of more than one state chart), parameter information, initial parameter values, actions to be taken by the state, and a checksum for the state, among other things. Transitions may include an identifier, a source state for the transition, a destination state for the transition, actions to be taken before, during or after the transition, and chart information, among other things. Junctions may be provided with an identifier, chart information, a junction subtype (e.g., connective junction or historical junction), nodes to be linked by the junction, and information indicating how the junction should operate, among other things.

One example of a source model language is Stateflow® of the MathWorks, Inc. of Natick, Mass. Stateflow models may be stored in a Simulink® of the MathWorks, Inc. of Natick, Mass. .mdl file.

As is clear from the above description, a state diagram may be described as a set of semantic elements connected in a particular structure. The semantics of the state diagram may be represented by relationships (such as expressions) between parameters, such as variables and constants. The parameters may be used in one or more states joined by one or more transitions or junctions. The number, containment, and connectedness of states, transitions, and junctions may describe the structure of the state diagram.

One or more embodiments may be discussed in connection with graphical state diagram models created and executed in the Stateflow® environment (hereinafter "Stateflow"). Embodiments may be implemented in a number of different applications and are not specifically limited in their application to particular embodiments described herein. For example, the present embodiments are not limited to state diagram models, but rather may be used with other types of models. In some embodiments a state machine may be represented as a table such as, for example, a state transition matrix Furthermore, the embodiments are not limited to the particular environments described herein and may be used with other suitable environments.

FIG. 1 depicts an example of a block diagram 100 incorporating a statechart 110 suitable for use with exemplary embodiments. The statechart 110 is represented as a block of the block diagram. The block receives two input parameters (a first input parameter 112, designated "u1," and a second input parameter 114, designated "u2"). The input parameters 112, 114 are provided by a first sine wave block 120 and a second sine wave block 130, respectively.

The statechart 110 may perform one or more computations using the input parameters 112, 114, and generate one or more output parameters. For example, the statechart 110 shown in FIG. 1 computes two output parameters (a first output parameter 116, designated "y1," and a second output parameter 118, designated "y2"). The block containing the statechart 110 provides the output parameters 116, 118 to a scope block 140.

Figure 2A:
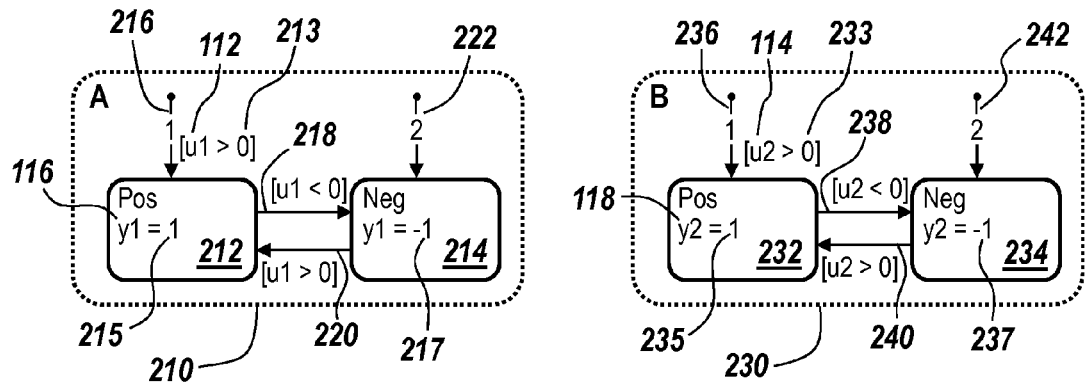
FIG. 2A depicts an example of two reuse candidates for use in the statechart of FIG. 1.

As noted above, the statechart 110 may include a number of states, transitions, and/or junctions. For example, FIG. 2A depicts two atomic subcharts 210, 230, which represent states that may be present in the statechart 110 of FIG. 1.

An "atomic subchart" is a chart for use in a state diagramming environment which encapsulates a portion of a state diagram and represents the states, transitions, and/or junctions of the portion in a single graphical element. The use of an atomic subchart may simplify the model design process by abstracting some of the detail of a diagram so that a user may focus on the overall structure of the state diagram.

Atomic subcharts may be particularly suited for use as a canonicalized representation because atomic subcharts represent a restricted version of a subchart in a way that allows for the reuse of the subchart. In order to allow for this reusability, restrictions may be placed on the structure and/or semantics of an atomic subchart in order to maintain its "atomic" nature. For example, an atomic subchart may be restricted from accessing data or graphical functions that reside in other states or subcharts; data in an atomic subchart may have to be defined explicitly, and any graphical functions called by the atomic subchart may have to be exported. Atomic subcharts may be limited to particular kinds of data (such as strongly-typed data). In some cases, an atomic subchart may not refer to event broadcasts which are outside the scope of the atomic subchart, and may not make use of supertransitions crossing the boundary of the atomic subchart. Atomic subcharts may not be used in some types of statecharts, such as continuous-time statecharts. Furthermore, if an entry action inside the atomic subchart requires access to a chart input or data store memory, the atomic subchart may yield inaccurate results; thus, the use of execute-at-initialization behavior in an atomic subchart should be avoided.

These restrictions allow an atomic subchart to be reused in many different contexts without relying on parameters which may or may not be present in each context. This list of restrictions is not exhaustive, and there are other behaviors which, if allowed in an atomic subchart, could cause an error or could cause the atomic subchart to yield inaccurate results. Such behaviors should be avoided in order to ensure that the atomic subchart behaves as expected in the different contexts in which the atomic subchart may be employed.

The first atomic subchart includes a state 212 named "Pos" (the "first positive state") and a state 214 named "Neg" (the "first negative state"). A first transition 216 defines a condition under which the first positive state 212 will be entered (i.e., when the first input parameter 112 is greater than a first constant 213; or, in other words, when u1 is greater than 0). A second transition 218 defines when the system can transition from the first positive state 212 to the first negative state 214 (i.e., when the system is in the first positive state 212 and first input parameter 112 is less than zero). A third transition 220 defines when the system can transition from the first negative state 214 to the first positive state 212 (i.e., when the system is in the first negative state 214 and the first input parameter 112 is greater than zero). And a fourth transition 222 defines when the system enters the first negative state 214.

Similarly, the second atomic subchart 230 includes a second positive state 232 and a second negative state 234, as well as a first transition 236, a second transition 238, a third transition 240, and a fourth transition 242. It should be noted that the structure of the first atomic subchart 210 and the structure of the second atomic subchart 230 are, in this case, identical.

That is, the first and second subcharts each include two states connected by the same number of transitions in the same way and connected to a same number of transitions in the same way. The only difference between the first atomic subchart 210 and the second atomic subchart (besides their respective names, "A" and "B") are the variables used in the states and transitions. Whereas the first atomic subchart 210 utilizes the first input parameter 112 and the first output parameter 116, the second atomic subchart 230 utilizes the second input parameter 114 and the second output parameter 118.

Furthermore, the first and second atomic subcharts 210, 230 include a number of expressions relating variables (e.g., the first and second input parameters 112, 116) to constants. For example, the first atomic subchart includes a first constant 213 (0), a second constant 215 (1), and a third constant 217 (−1). The second atomic subchart 230 also includes a first constant 233 (0), a second constant 235 (1), and a third constant 237 (−1).

It should also be noted that some state diagrams allow for hierarchical representations. As noted above, states in a state diagram may become active upon the occurrence of an event, and may perform one or more operations while active. In a hierarchical state diagram, some states (known as "parent states") may call other states (known as "child states") as a part of those operations. Thus, a child state may be nested in a parent state so that the child state can become active upon the occurrence of an event in the context of the parent state. A state diagram may have an arbitrary number of levels of hierarchy; thus, a child state may have its own child states.

For example, if the first atomic subchart 210 is used as a state in a state diagram, the first atomic subchart 210 would be considered a parent state, and the first positive state 212 and first negative state 214 would be considered child states.

The hierarchy of a state diagram or a portion of a state diagram may be taken into account when determining the structure of the state diagram or portion. For example, the hierarchy of a state may describe a number of child states (zero or more), a number, source, and destination for transitions among the child states (zero or more), and a number of junctions among the child states and transitions. Junctions are described in more detail below with respect to FIG. 2B.

Figure 2B:
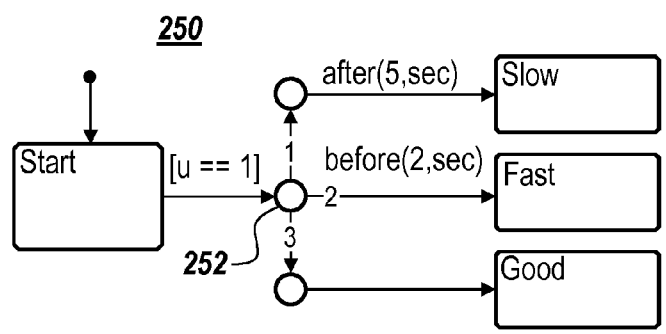
FIG. 2B depicts an example of a statechart including junctions.

FIG. 2B depicts a statechart 250 that includes a junction 252 among the transitions. The particular junction 252 of FIG. 2B represents a type of if-then-else construct. If control flows to the junction 252 during execution of the state chart 250, the junction consults the system clock to determine a time, such as a simulation time. If the time is before 2 seconds, control is passed to the "Fast" state. If the time is after 5 seconds, control is passed to the "Slow" state. Otherwise, control is passed to the "Good" state.

Junctions may enable the representation of different possible transition paths for a single transition. Connective junctions may be used to represent the following features, among others:

Variations of an if-then-else decision construct, by specifying conditions on some or all of the outgoing transitions from the connective junction A self-loop transition back to the source state if none of the outgoing transitions is valid Variations of a for loop construct, by having a self-loop transition from the connective junction back to itself Transitions from a common source to multiple destinations Transitions from multiple sources to a common destination Transitions from a source to a destination based on common events Another type of junction is a history junction. A history junction represents historical decision points in a statechart. The decision points are based on historical data relative to state activity. Placing a history junction in a parent state indicates that historical state activity information may be used to determine the next state to become active.

The present techniques allow a statechart or a portion of a statechart to be generalized so that they can be reused in multiple contexts. For example, the states, transitions, and junctions of a state chart or a portion of a statechart may be canonicalized to provide a canonicalized version of the statechart or portion. The statechart or portion of the statechart to be canonicalized is referred to herein as a "reuse candidate."

Figure 3A:
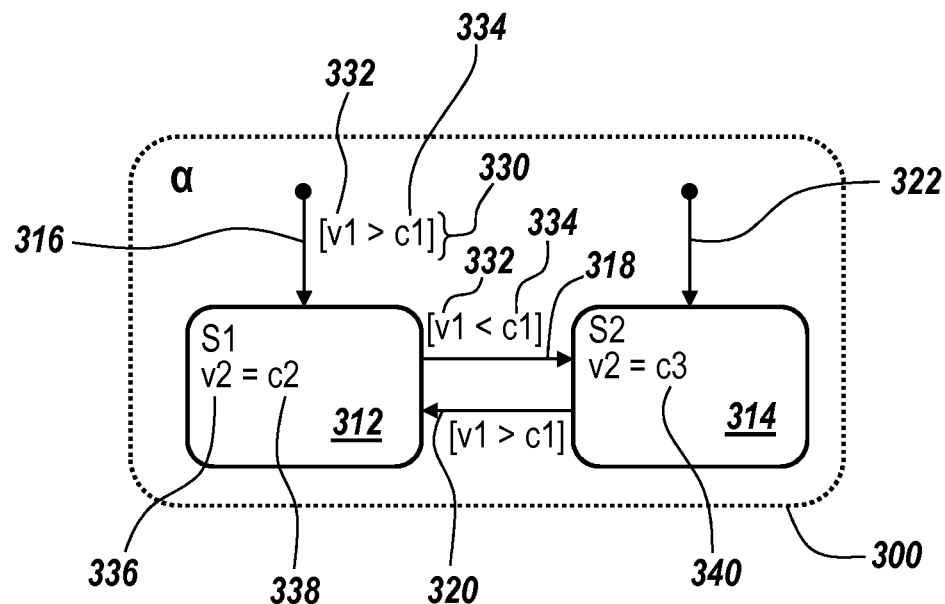
FIG. 3A depicts a canonicalized version of the reuse candidate of FIG. 2A.

For example, FIG. 3A depicts a canonicalized version of the reuse candidates represented by the atomic subcharts 210 and 230 of FIG. 2A. As shown in FIG. 3A, the canonicalized version is represented as an atomic subchart 300. The atomic subchart 300 includes a first placeholder state 312 and a second placeholder state 314. Four placeholder transitions 316, 318, 320, and 322 are provided for representing the transitions of the reuse candidates. The canonicalized version may include placeholder states representing the states of the reuse candidates, zero or more placeholder child states representing the zero or more child states of the reuse candidates, zero or more placeholder child transitions representing the zero or more child transitions of the reuse candidates, and zero or more placeholder child junctions representing the zero or more child junctions of the reuse candidates.

The reuse candidates may have names (such as "A" and "B" in FIG. 2A), and the canonicalized version may use reuse candidate symbols in place of the reuse candidate names. For example, the atomic subchart 300 of FIG. 3A is provided with the name α. In some embodiments, the name of the canonicalized version may be computed based on the structure of the canonicalized version; for example, the structure of the canonicalized version may be represented as a signature (as described in more detail below with respect to FIG. 5) and the name of the canonicalized version may be the signature or a variation of the signature, such as a hash of the signature. In this way, a suitable canonicalized version of a reuse candidate can be located more quickly by calculating the signature of the reuse candidate and searching amongst a number of canonicalized versions to find the signature in the name of the canonicalized version.

Furthermore, the reuse candidates may include parameters, such as variables and constants, either alone or referenced within expressions. The canonicalized version may include canonicalized versions of the parameters, variables, and expressions. For example, the reuse candidate represented by the first atomic subchart 210 of FIG. 2A includes the following expression:

$$u1>0$$

Whereas the reuse candidate represented by the second atomic subchart 230 of FIG. 2A includes the following expression:

$$u2>0$$

The atomic subchart 300 of FIG. 3A replaces these expressions with a canonicalized expression 330 that relates a first canonicalized variable 332 (designated "v1"), which represents the variables from the reuse candidates (u1 and u2 in reuse candidate A and B, respectively) to a first canonicalized constant 334 (designated "c1"), which represents the constant from the reuse candidates (i.e., 0).

Similarly, a second canonicalized variable 336 ("v2"), which in this case represents the first and second output parameters 116 and 118, is provided in the atomic subchart 300. A second canonicalized constant 338 ("c2") represents the second constants 215, 235, and a third canonicalized constant 340 ("c3") represents the third constants 217, 237.

It should be noted that, in the example depicted in FIG. 3A, the second canonicalized constant 338 and the third canonicalized constant 340 could have been represented using the same constant. This is because, in the reuse candidates, the third constants 217, 237 are simply the negative version of the first constants 215, 235 (i.e., −1 as opposed to 1). Accordingly, the second canonicalized constant 338 could be represented as "c2" in this case, and the third canonicalized constant 340 could be represented as "−c2." In the canonicalized version depicted in FIG. 3A, however, the second and third canonicalized constants 338, 340 have been assigned different identifiers. Either approach is acceptable, and each presents different benefits/trade-offs. For example, if the second canonicalized constant 336 and the third canonicalized constant 340 are assigned different identifiers (as is done in FIG. 3A), then more reuse candidates can be represented by the same canonicalized version. That is, the canonicalized version depicted in FIG. 3A would be capable of representing a third reuse candidate whose second state includes the expression "y2=7," because 7 could simply be substituted for the third canonicalized constant 340. This would not be the case for a canonicalized version that represents the third canonicalized constant 340 as the negative version of the second canonicalized constant 338. On the other hand, representing the third canonicalized constant as the negative version of the second canonicalized constant requires fewer identifiers for the constants and variables and helps to simplify the statechart.

In another embodiment, a value for a canonicalized parameter may be used instead. For example, for canonicalized constant 334 both of the reuse candidates 210, 230 employ value 0 and so the value 0 may be used in place of the canonicalized constant 334.

The canonicalized version depicted in FIG. 3A may be used in place of the reuse candidates 210, 230. However, the canonicalized version may need to be parameterized before it can be used. That is, the reuse candidates include concrete parameters (such as "u1"), whereas the canonicalized version refers to canonicalized parameters (such as "v1"). In order to use the canonicalized version in place of the reuse candidates, the canonicalized version may require that the canonicalized parameters be replaced with the parameters used by the reuse candidate. This may be accomplished by providing a parameterized link between the reuse candidate and the canonicalized version.

Figure 3B:
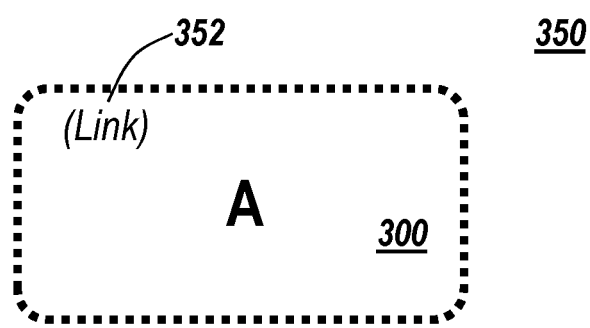
FIG. 3B depicts a linked canonicalized version of the canonicalized atomic subchart of FIG. 3A.

FIG. 3B depicts a linked canonicalized version 350 of the canonicalized atomic subchart 300 of FIG. 3A. The linked canonicalized version 350 includes a link 352 which allows the parameters of the respective reuse candidates to be used in the canonicalized version.

The link 352 may represent a logical association between the reuse candidate and the canonicalized version that is populated with parameters allowing the canonicalized version to be substituted for the reuse candidate. The link 352 may be stored with the canonicalized version of the reuse candidate, or may be stored in the statechart in which the reuse candidate occurs. For example, when a reuse candidate is identified and implemented in a canonicalized version, the link 352 may be in the form of a table, and the canonicalized version may update the table to designate which variables and constants the canonicalized variables and constants replace. An example of such a table for the canonicalized version of FIG. 3A is shown below:

TABLE 1

A Parameterized Link Stored with a Canonicalized Version

| Canonicalized Version α | First Reuse Candidate A | Second Reuse Candidate B |
|---|---|---|
| v1 | u1 | u2 |
| v2 | y1 | y2 |
| c1 | 0 | 0 |
| c2 | 1 | 1 |
| c3 | −1 | −1 |

In another embodiment, the parameterized link 352 may be stored with the reuse candidate in the original statechart. An example of a table for use in a link suitable for the first atomic subchart 210 (the first reuse candidate A) is shown below:

TABLE 2

A Parameterized Link Stored with a Reuse Candidate

| Canonicalized Version α | Reuse Candidate A |
|---|---|
| v1 | u1 |
| v2 | y1 |
| c1 | 0 |
| c2 | 1 |
| c3 | −1 |

Memory overhead in storing a link such as the one represented by Table 2 may be greater than the overhead for Table 1. However, for large state diagrams where a canonicalized version may represent many reuse candidates, the processing advantage may outweigh the memory overhead, as the respective parameters can be found more quickly for each reuse candidate when a link such as the one represented by Table 2 is used.

In the examples described above, the structure of the canonicalized version is an exact match for the structure of the reuse candidates. That is, each reuse candidate 210, 230 includes the same number of states, connected in the same way by the same number of transitions. However, this structural identity is not required. For example, FIG. 4A depicts structurally non-identical reuse candidates that may be replaced by the same canonicalized statechart.

Figure 4A:
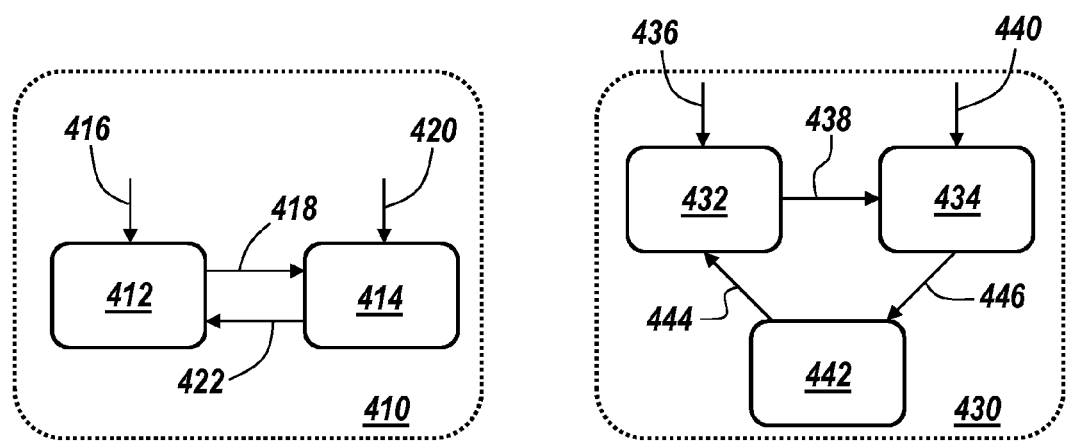
FIG. 4A depicts structurally non-identical reuse candidates which may be replaced by the same canonicalized statechart.

As shown in FIG. 4A, a first reuse candidate 410 includes a first state 412 and a second state 414. Furthermore, the first reuse candidate 410 includes a first transition 416, a second transition 418, a third transition 420, and a fourth transition 422.

A second reuse candidate 430 includes three states: a first state 432, a second state 434, and a third state 442. The second reuse candidate also includes a first transition 436, a second transition 438, a third transition 440, a fourth transition 444, and a fifth transition 446.

Thus, the first and second reuse candidates 410, 430 have some structural similarities and some structural differences. For example, the first and second states 412, 414 of the first reuse candidate 410 are structurally similar to the first and second states 432, 434 of the second reuse candidate. In addition, the first, second, and third transitions 416, 418, 420 of the first reuse candidate 410 are similar to the first, second, and third transitions 436, 438, and 440 of the second reuse candidate 430. On the other hand, the fourth transition 422 of the first reuse candidate 410 is not present in the second reuse candidate 430, and the third state 442 and fourth and fifth transitions 444, 446 of the second reuse candidate 430 are not present in the first reuse candidate 410.

Figure 4B:
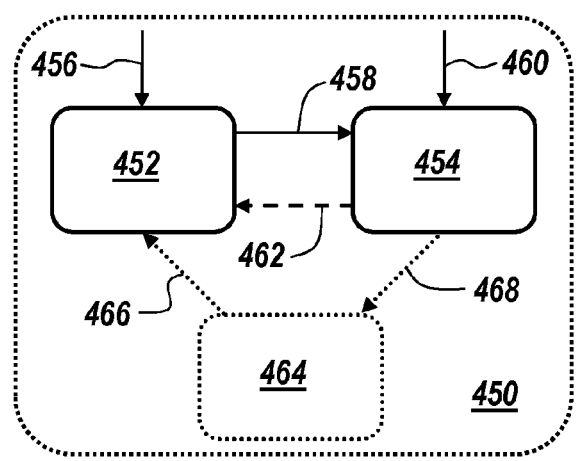
FIG. 4B depicts a canonicalized version of the structurally non-identical reuse candidates of FIG. 4A.

In order to accommodate both the first and second reuse candidates 410, 430 in the same canonicalized version, the union of the reuse candidates 410, 430 may be canonicalized. FIG. 4B depicts a canonicalized version 450 of the structurally non-identical reuse candidates 410, 430 of FIG. 4A.

In the canonicalized version, the first state 452 and second state 454 are represented, these states being common to both the first reuse candidate 410 and the second reuse candidate 430. Similarly, the canonicalized version includes a first transition 456, a second transition 458, and a third transition 460, these transitions being common to both the first reuse candidate 410 and the second reuse candidate 430.

The canonicalized version also includes a fourth transition 462 (indicated in FIG. 4A by dashed lines), which is present in only the first reuse candidate 410. Similarly, the canonicalized version includes a third state 464 (indicated by dotted lines), which corresponds to the third state 442 of the second reuse candidate 430, and fifth and sixth transitions 466, 468 (also indicated by dotted lines), which correspond to the fourth and fifth transitions 444, 446 of the second reuse candidate 430, respectively.

Thus, the canonicalized version represents the union of the first and second reuse candidates 410, 430. In order to use the canonicalized version in place of the reuse candidates 410, 430, the canonicalized version may be stored with instructions indicating whether to use the elements indicated by dashed lines (i.e., the elements present in only the first reuse candidate 410) or the elements indicated by dotted lines (i.e., the elements present in only the second reuse candidate 430). For example, the canonicalized version may include instructions that, when the canonicalized version is called to represent the first reuse candidate 410, the fourth transition 462 should be used. The instructions may further stipulate that, when the canonicalized version is called upon the represent the second reuse candidate 430, the third state 464 and the fifth and sixth transitions 466, 468 may be used.

In another embodiment, the canonicalized version may represent for example states, junctions and transitions of the reuse candidates by commands for their creation. For example, a reuse candidate may consist of a set of similar states and the canonicalized version may automatically create the required number of states based on link information.

Although FIG. 4B shows a canonicalized version that mimics structurally non-identical reuse candidates, a similar technique may be employed to represent semantically non-identical reuse candidates. That is, the union of variables, parameters, and/or expressions may be stored along with instructions for representing the appropriate semantics for each reuse candidate. For example, if the first state 412 of the first reuse candidate 410 includes the following expression:

$y1 = u1 + u2$, but the first state 432 of the second reuse candidate 430 includes the following expression:

$y2 = u2$, then the canonicalized first state 452 may include both expressions with parameters stored in a canonical manner (i.e., with variables and constants replaced by canonical versions), and further with instructions for using the appropriate expression, depending on which reuse candidate is being replaced.

Figure 5:
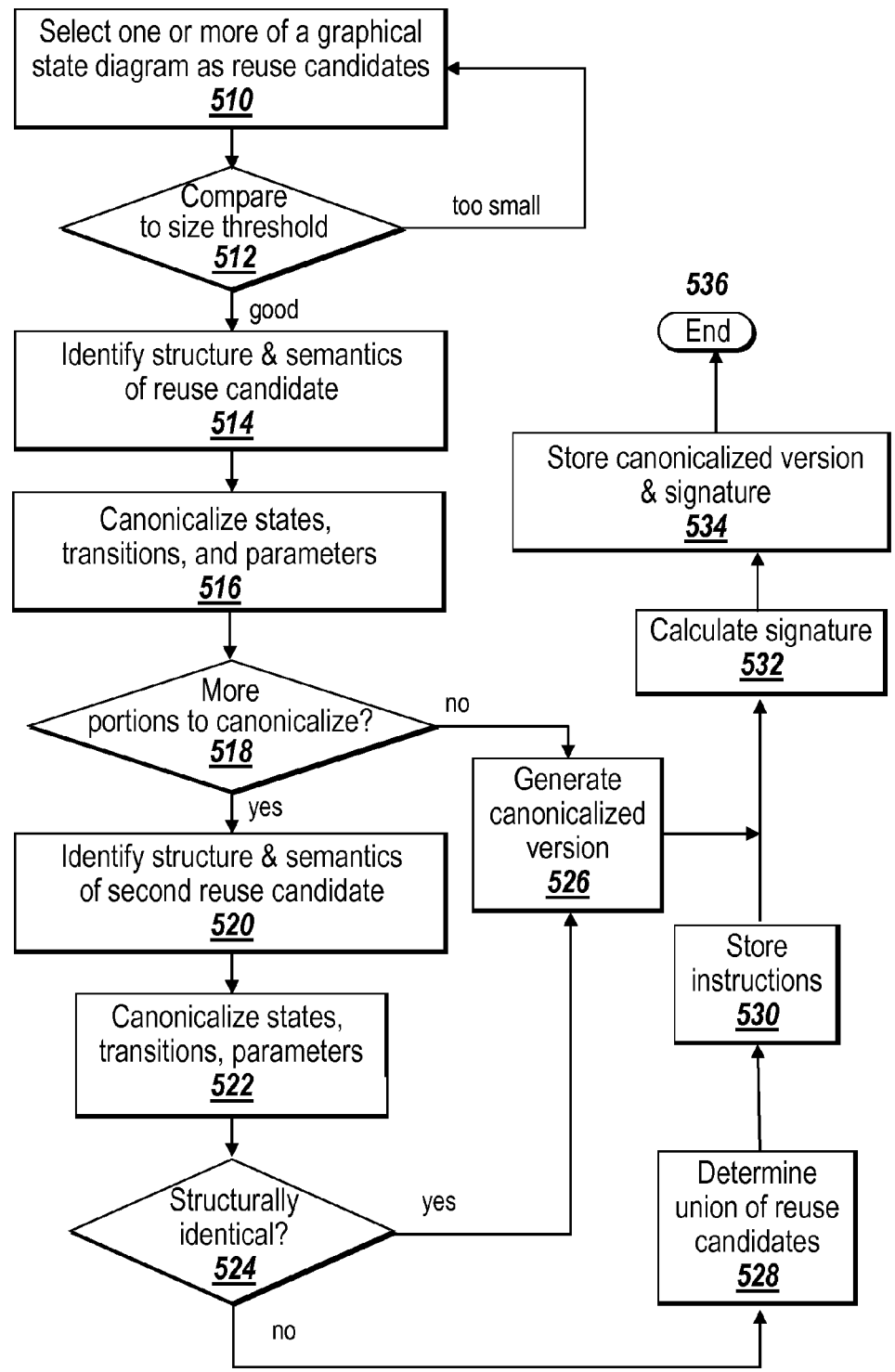
FIG. 5 is a flowchart describing an exemplary procedure for generating a canonicalized version of a statechart.

As noted above, in some embodiments the canonicalized versions may be generated based on one or more reuse candidates that are suitable for replacement with canonicalized versions. FIG. 5 is a flowchart describing an exemplary procedure for generating a canonicalized version of a statechart.

At step 510, a portion of a graphical state diagram may be selected as a reuse candidate. The portion may be selected by a user through a graphical user interface, as in the case where, for example, the user is designing a statechart having states that the user knows will be repeated. In other embodiments, the portion may be selected programmatically, such as by using a processor. The processor may select the portion, for example, by performing an analysis of the statechart and identifying repeated structures and/or semantic information. For example, the processor may identify the structure and semantics of selected hierarchies in the model, or of groups of states, transitions, and junctions.

In some embodiments, identifying the structure and semantics of the reuse candidates may involve determining a signature of one or more elements of the reuse candidates. For example, the reuse candidates may be represented in a source model language and may be stored in a model file such as a library file suitable for reuse with multiple different models. If the reuse candidates are represented in a source model language, then the elements (or parts of the elements) in the source model language may be used to determine the signature of the reuse candidate. For example, if the reuse candidate includes two states (with ids "A" and "B," respectively) and four transitions (with ids "1," "2," "3," and "4", where transition 1 originates at state A and terminates at state B; transition 2 originates at state B and terminates at state A; transition 3 originates outside of the reuse candidate and terminates at state A, and transition 3 originates outside of the reuse candidate and terminates at state B), then the signature may be some variation of, for example, "{A, B}; {A→B, B→A, →A, →B}", which may be one of several ways of representing a signature based on the information in the source model language or in other sources related to the model. Other information may also be used in the signature, such as transition conditions, junction information, and semantic information regarding parameters in the model.

The signature of potential reuse candidates may be compared against the signature of other reuse candidates. Reuse candidates with similar or compatible signatures may be selected for replacement by a common, canonicalized version.

At step 512, the portion may be compared to a predetermined size threshold. The predetermined size threshold may be set by a user, set programmatically, may be a default value, etc. The predetermined size threshold may help to ensure that small canonicalized versions are not generated. For example, the predetermined size threshold may be set to a certain minimum number of states and/or transitions which must be present in the portion before the portion will be considered as a reuse candidate.

If the determination at step 512 is that the selected portion is too small, then processing may return to step 510 and another portion of the model may be selected as a potential reuse candidate. If, on the other hand, the determination at step 512 is that the portion meets or exceeds the predetermined size threshold, processing proceeds to step 514.

At step 514, a structure and semantics of the reuse candidate may be identified. The structure of the reuse candidate may be, for example, a description of the number and connectedness of states, transitions, and/or junctions. The structure may be represented, for example, using an array or matrix that describes which states are connected to which other states using transitions, and the direction of the transitions. The array or matrix may be compared to other structural arrays or matrices to determine how structurally similar two reuse candidates are (or how structurally similar a reuse candidate is to a canonicalized version). In some embodiments, the structure and/or semantics of the reuse candidate may be determined using a signature, such as the one described above in step 510.

The semantics of the reuse candidate may be represented by a description of the number and types of parameters, such as variables and constants, and expressions relating the parameters.

At step 516, the parameters, states, and transitions of the reuse candidate may be canonicalized. In one embodiment, the states and transitions of the reuse candidate (or candidates, if more than one is present) are canonicalized in the following manner. A depth-first-search (DFS) algorithm may be used to traverse through the state hierarchy of each reuse candidate. Each state may be numbered based on its position in the hierarchy.

Each state may be associated with a transition-flow graph describing the transitions to and from the state. As each state is visited, a local DFS may be used for the transition-flow graphs of the state to number the transitions.

Once the states and transitions are numbered, the state names may be replaced by the state numbers, which represent a canonicalized version of the state names. Transitions in the reuse candidate may or may not have names. If the transitions are associated with names, the transition names may be replaced with the transition numbers generated during the DFS. The transition numbers represent canonicalized versions of the transition names. If the transitions are not associated with names, a logical association may be created between the transition and the number generated during the DFS.

Further, the parameters of the states and transitions of the reuse candidates may be canonicalized in the following manner. A DFS may be used to visit the state hierarchy. For each state visited, symbols used in actions performed by the state may be identified and numbered in the order in which they are found.

For each state, a local DFS may be conducted to visit each of the transitions attached to the state. For each transition, symbols used in the transitions conditions and actions may be numbered in the order in which they are found.

Once the symbols have been numbered, the symbols may be replaced with the symbol numbers generated during the DFS. The symbol numbers represent canonicalized versions of the parameter names.

At step 518, it is determined whether more portions of the statechart should be canonicalized. For example, if the user selects more than one portion of the state diagram at step 510, or if the processor determines that there is a repeating structure in the statechart, then multiple portions of the state diagram may be canonicalized. If the answer at step 518 is "no," then processing may proceed directly to step 526 and a canonicalized version of the portion may be generated.

On the other hand, if the answer at step 518 is "yes," then at step 520 the structure and semantics of the second reuse candidate are determined. At step 522, the parameters, states, and transitions of the second reuse candidate are parameterized in the same manner as in step 516.

At step 524, it is determined whether the two or more reuse candidates are structurally identical. For example, if the structures were identified by determining an array or matrix at steps 514 and 520, or by otherwise calculating a signature of the reuse candidates, then the arrays, matrices, or signatures may be compared to determine whether the reuse candidates are structurally identical.

If the answer at step 524 is "yes," then at step 526, a canonicalized version with a single structure identical to the structure of the reuse candidates is generated. The canonicalized version may include canonicalized parameters, states, and transitions representing the parameters, states, and transitions generated in steps 516 and 522, if applicable.

If, on the other hand, the answer at step 524 is "no," then processing proceeds to step 528 and the union of the reuse candidates is determined. The union is stored as a single canonicalized version, and at step 530 instructions are determined and stored. The instructions may designate which portion of the canonicalized version should be used under which circumstances, for example depending on the context that the canonicalized version is used in the statechart.

Regardless of whether processing proceeds to step 526 or step 528, the structure of the canonicalized version may be determined in a number of ways. For example, the number and connectedness of states, transitions, and junctions for a reuse candidate may be determined. Further, the number and connectedness of a hierarchy of the reuse candidate may be determined, if the reuse candidate is in a hierarchical state diagram. For example, the reuse candidate may include one or more states, zero or more transitions, zero or more junctions, zero or more child states, zero or more child transitions, and zero or more child junctions, and so on. The canonicalized version of the reuse candidates may include a placeholder state representing the state, zero or more placeholder transitions representing the transitions, zero or more placeholder junctions representing the junctions, zero or more placeholder child states representing the zero or more child states, zero or more placeholder child transitions representing the zero or more child transitions, and zero or more placeholder child junctions representing the zero or more child junctions.

In some embodiments, portions of the reuse candidates (or the reuse candidates as a whole) may be provided with names. The canonicalized version of the reuse candidates may also include names for the portions, or for the canonicalized version as a whole. In order to facilitate the replacement of the canonicalized version for the reuse candidates, the portions may be assigned the same or similar names, if the respective portions are semantically equivalent. For example, if both reuse candidates include an expression that can be canonicalized using the same canonicalized parameters, the expression may be assigned a representative name or symbol in the canonicalized version. In the future, if a potential reuse candidate is being considered for canonicalization, then by determining the canonicalized semantics of the potential reuse candidate, a suitable name can be generated and compared to the semantic name of the canonicalized version. If the two match, it can be assumed that the potential reuse candidate can be canonicalized by the canonicalized version and maintain the same semantics.

Steps 520-530 may be repeated as necessary to accommodate three or more reuse candidates. Optionally, as each reuse candidate is canonicalized (e.g., during steps 516 and 522), the canonicalized versions of the reuse candidates may be compared to ensure that the canonicalized versions are indeed identical.

At step 532, a signature of the canonicalized version may be calculated, and may be stored with the canonicalized version in step 534. The signature may be, for example, a structural signature that allows the canonicalized version to be quickly recalled if the structure of a particular reuse candidate is known. At step 536, processing completes.

Figure 6:
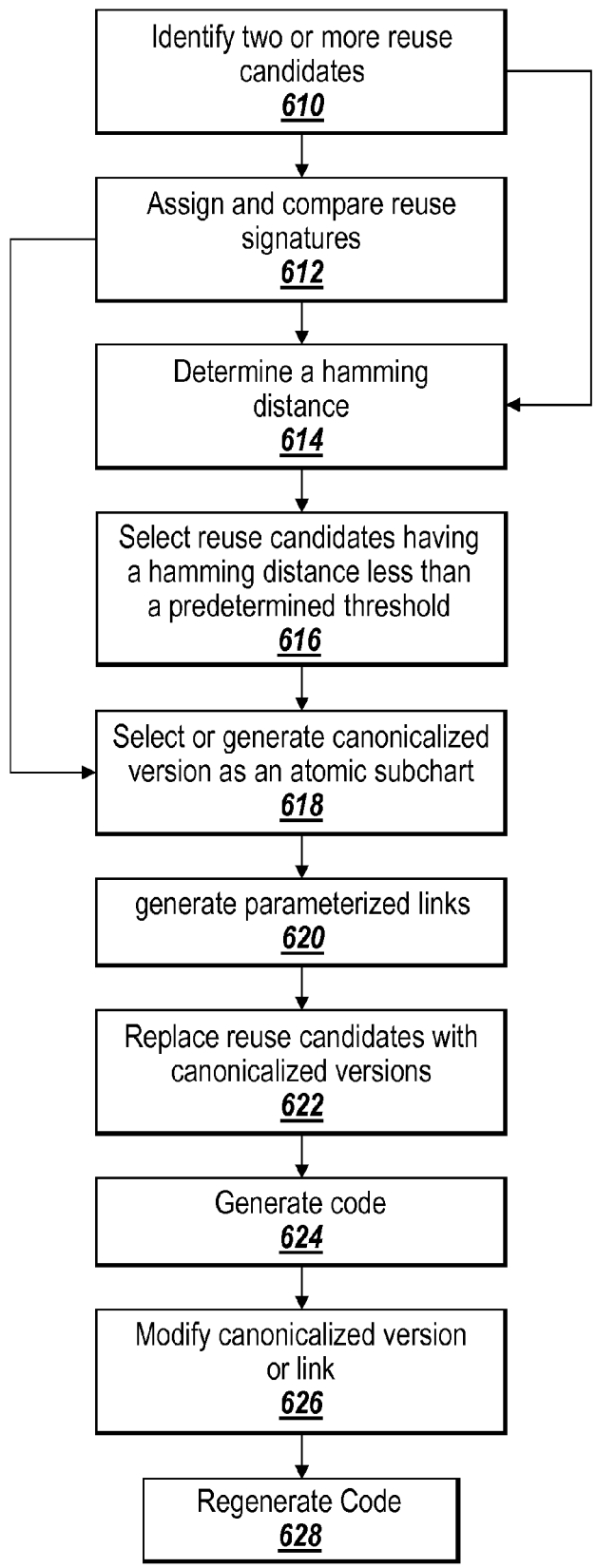
FIG. 6 is a flowchart depicting an exemplary procedure for substituting a canonicalized version of a statechart for a reuse candidate.

If canonicalized versions of reuse candidates are available, then a statechart may be simplified by substituting the canonicalized versions for the reuse candidates. FIG. 6 is a flowchart depicting an exemplary procedure for substituting a canonicalized version of a statechart for a reuse candidate.

At step 610, two or more reuse candidates may be identified. The reuse candidates may be identified, for example, by a user or by a processor. The reuse candidates may be identified based on their structural and/or semantic similarity. The reuse candidates may include at least one element in the state diagram model, such as a state, a transition, or a junction.

In some embodiments, identifying the reuse candidates may involve determining a similarity metric representing the similarity between two reuse candidates. Accordingly, in one embodiment, reuse signatures may be assigned to the reuse candidates in step 612. The reuse signatures may represent the structure and/or semantics of the reuse candidates. For example, the reuse signature may be represented as a matrix or array indicating the number and connectedness of states, transitions, and junctions in the reuse candidate, as well as any hierarchy captured by the reuse candidate. The similarity metrics may be compared in order to determine whether two reuse candidates are similar enough to be replaced, for example by comparing the difference in reuse signatures against a predetermined threshold.

As an alternative or in addition to step 612, at step 614, a Hamming distance may be determined for pairs of states among the reuse candidates. A Hamming distance is a well-known metric in information theory for determining the similarity between two elements. For example, the structure and/or semantics of the respective reuse candidates may be represented as a string, and the difference between the two strings may be determined. At step 616, two candidates having a Hamming distance less than a predetermined threshold may be selected for canonicalization.

Regardless of the method used to calculate the similarity between reuse candidates, at step 618, two or more reuse candidates which are similar enough to be canonicalized (e.g., within a predetermined similarity tolerance) may be selected and canonicalized. The reuse candidates may be canonicalized as described above with respect to FIG. 5. The canonicalized version may be represented, for example, as an atomic subchart.

At step 620, parameterized links may be generated for the canonicalized version. By replacing the canonicalized parameters of the canonicalized version with the information specified by the parameterized links, the canonicalized version may be used to represent any or all of the reuse candidates. Accordingly, at step 622, one or more of the reuse candidates may be replaced with the linked canonicalized versions.

Optionally, at step 624 code may be generated for the statechart including the canonicalized versions. The code may be, for example, source code including electronic-device executable instructions that, when executed, cause the electronic device to carry out a simulation that simulates the dynamic system represented by the statechart. If, at step 626, the canonicalized version or the parameterized link is modified (thus changing the functionality of the underlying reuse candidates), it may be necessary to regenerate code for the model at step 628. However, because the canonicalized version is used in the statechart, only the code for the canonicalized version (or the changed reuse candidate individually) is regenerated, without regenerating the code for the rest of the statechart. Thus, it is not necessary to regenerate code for the model as a whole when incremental changes are made to the reuse candidates.

Figure 7A:
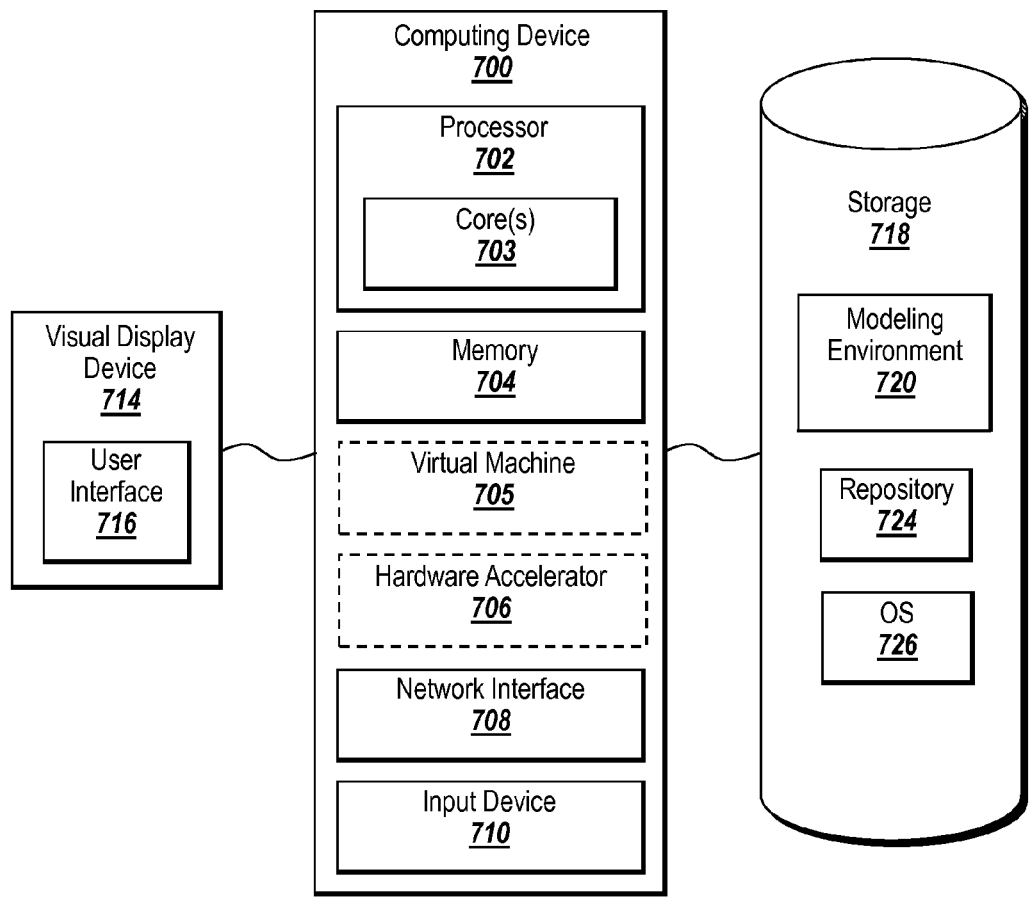
FIG. 7A depicts an electronic device that may be suitable for use with the one or more embodiments disclosed herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 7A depicts an electronic computing device 700 that may be suitable for use with one or more acts disclosed herein.

The computing device 700 may take many forms, including but not limited to a computer, workstation, server, network computer, quantum computer, optical computer, Internet appliance, mobile device, a pager, a tablet computer, a smart sensor, application specific processing device, etc.

The computing device 700 depicted in FIG. 7A is illustrative and may take other forms. For example, an alternative implementation of the computing device 700 may have fewer components, more components, or components that are in a configuration that differs from the configuration of FIG. 7A.

The processor 702 may include hardware or software based logic to execute instructions on behalf of the computing device 700. In one implementation, the processor 702 may include one or more processors, such as a microprocessor. In one implementation, the processor 702 may include hardware, such as a digital signal processor (DSP), a field programmable gate array (FPGA), a Graphics Processing Unit (GPU), an application specific integrated circuit (ASIC), a general-purpose processor (GPP), etc., on which at least a part of applications can be executed. In another implementation, the processor 702 may include single or multiple cores 703 for executing software stored in a memory 704, or other programs for controlling the computing device 700.

The computing device 700 may include one or more tangible non-transitory computer-readable storage media for storing one or more computer-executable instructions or software that may implement one or more embodiments of the invention. The memory 704 may include a computer system memory or random access memory (RAM), such as dynamic RAM (DRAM), static RAM (SRAM), extended data out RAM (EDO RAM), etc. The memory 704 may include other types of memory as well, or combinations thereof.

One or more processors 702 may include a virtual machine (VM) 705 for executing the instructions loaded in the memory 704. A virtual machine 705 may be provided to handle a process running on multiple processors so that the process may appear to be using only one computing resource rather than multiple computing resources. Virtualization may be employed in the computing device 700 so that infrastructure and resources in the computing device may be shared dynamically. Multiple VMs 705 may be resident on a single processor 702.

A hardware accelerator 706, may be implemented in an ASIC, FPGA, or some other device. Hardware accelerator 706 may be used to speed up the general processing rate of the computing device 700.

The computing device 700 may include a network interface 708 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the computing device 700 to any type of network capable of communication and performing the operations described herein.

The computing device 700 may include one or more input devices 710, such as a keyboard, a multi-point touch interface, a pointing device (e.g., a mouse), a gyroscope, an accelerometer, a haptic device, a tactile device, a neural device, a microphone, or a camera, that may be used to receive input from, for example, a user. Note that computing device 700 may include other suitable I/O peripherals.

The input devices 710 may be allow a user to provide input that is registered on a visual display device 714. A graphical user interface (GUI) 716 may be shown on the display device 714.

A storage device 718 may also be associated with the computer 700. The storage device 718 may be, for example, a hard-drive, CD-ROM or DVD, Zip Drive, tape drive, or other suitable tangible computer readable storage medium capable of storing information. The storage device 718 may be useful for storing application software programs, such as a modeling application or environment 720 (which may be, for example the Simulink® environment or the Stateflow® environment), and for storing a repository 724 and an operating system (OS). Examples of modeling environments may include, for example, state machine diagram environments, such as those found within Stateflow®, also available from The MathWorks, Inc., and diagramming environments, such as Unified Modeling Language (UML) diagramming environments, and other graphical modeling environments. Note that the software programs may include computer-executable instructions that may implement one or more embodiments of the invention.

The computing device 700 can be running an operating system (OS) 726. Examples of OS 726 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile computing devices, or other operating system capable of running on the computing device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 7B:
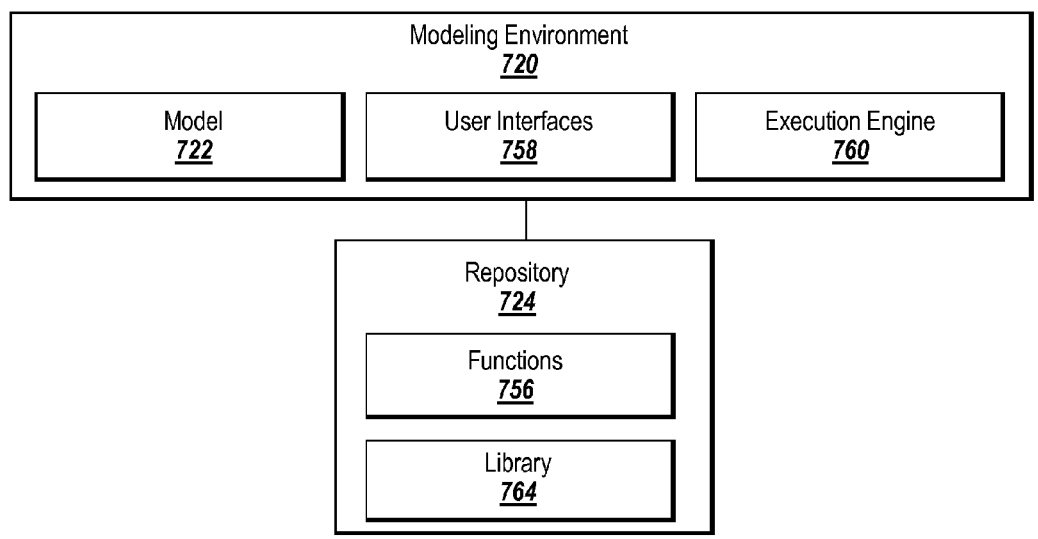
FIG. 7B depicts a modeling environment that may be suitable for use with one or more embodiments disclosed herein.

FIG. 7B depicts modeling environment 720 and repository 724 of FIG. 7A in more detail. The modeling environment 720 may include an editor, which may allow a user to create and modify a block diagram model representing a dynamic system.

The modeling environment 720 may also allow a user to create and store data relating to graphical entities. The modeling environment may include a textual interface that supports a set of commands that may allow interaction with the editor. Using this textual interface, the user may write special scripts that may perform automatic editing operations on a diagram of a model. The user may interact with one or more windows that may act as canvases for the model. The model may be partitioned into multiple hierarchical levels through the use of subsystems and subcharts and different levels of the model's hierarchy may be displayed in different canvases.

One or more interface tools within the modeling environment 720 may be used by a user to create a diagram model. For example, the interface tools may include a palette, a wiring line connection tool, an annotation tool, a formatting tool, an attribute editing tool, a save/load tool and a publishing tool. The palette may include a library of predefined entities that may be available to the user for building the diagram. The palette may be customized by the user to: (a) reorganize one or more entities in some custom format, (b) delete one or more entities, and/or (c) add one or more custom entities that the user may have designed. The palette may allow one or more entities to be dragged using a human-machine interface (such as a mouse or keyboard) from the palette on to a canvas that may be displayed in a window.

The modeling environment 720 may run under the control of an operating system, such as OS 726. The modeling environment 720 may enable, for example, a user to build and execute a model 752 of a system. The modeling environment 720 may include a text-based modeling environment, a graphical modeling environment, or some other modeling environment. Examples of modeling environments that may implement one or more embodiments of the invention may include MATLAB® and Simulink®, Stateflow®, Simscape™, and SimMechanics™ which are available from The MathWorks, Inc.; LabVIEW® or MATRIXx available from National Instruments, Inc; Mathematica® available from Wolfram Research, Inc.; Mathcad available from Mathsoft Engineering & Education Inc.; Maple™ available from Maplesoft, a division of Waterloo Maple Inc.; Poseidon for UML by Gentleware, AG of Hamburg, Germany; MagicDraw by NoMagic, Inc., of Plano, Tex.; Comsol available from Comsol AB of Sweden; Scilab™ available from The French National Institution for Research in Computer Science and Control (INRIA), Le Chesnay Cedex, France; and GNU Octave, available from the GNU Project; SoftWIRE available from Measurement Computing; VisSim available from Visual Solutions; WiT available from DALSA Coreco; VEE Pro available from Agilent; Dymola available from Dynasim AB; Extend available from Imagine That, Inc.; Scicos available from The French National Institution for Research in Computer Science and Control (INRIA); MSC.Adams® available from MSC.Software Corporation; Rhapsody® and Rational® available from International Business Machines Corporation; ARTiSAN Studio available from ARTiSAN Software Tools, Inc.; and SCADE™ from Esterel Technologies, Inc.

In the modeling environment 720, one or more instructions may be generated for the model 722. The instructions may be, for example source code, intermediate representations, etc., to be used to simulate the model or to execute the model on a target device. The generated instructions may be stored in a repository 724. The modeling environment 720 may enable processing of the model 722 using the instructions previously stored in the repository 724.

The modeling environment 720 may communicate with the repository 724. The modeling environment 700 may generate instructions for the model 722 and store the instructions in the repository 724. The instructions may be stored in the repository 724, for example, as functions 756 in software. Note that the instructions may be stored in the repository 724 other forms, such as processes that may be implemented in hardware. The instructions stored in the repository 724 may be shared in processing other models to reduce memory or other requirements for processing other models.

The repository 724 may include a collection of information that may be stored in memory or storage. The repository 724 may be, for example, a database with code for functions and checksums for one or more of the functions. Furthermore, the repository 724 may store one or more canonicalized versions of charts or portions of charts, for example in the library 764.

The modeling environment 720 may also include user interfaces 758 and an execution engine 760. The modeling environment 720 may allow a user to build model 722 of a system using user interfaces 758. The model 722 may include, for example, states and transitions.

The execution engine 760 may compile and link the model 722 to generate an executable form of instructions for carrying out execution of the model. The model 722 may be executed to simulate the system represented by the model 722. The simulation of the model 722 may determine the behavior of the system represented by the model 722.

The execution engine 760 may convert the model into an executable form. The executable form may include one or more executable instructions. The execution engine 760 may compile and link the model to produce the executable form of the model. The executable form of the model may be executed to determine a behavior of the model. Compiling may involve checking an integrity and validity of one or more component connections in the model. Here, the execution engine 760 may also sort one or more components in the model into hierarchical lists that may be used to create one or more component method execution lists. When linking the model, the execution engine 760 may use one or more results from the compilation of the model to, for example, allocate memory that may be needed for an execution of the executable form of the model. Linking may also involve producing one or more component method execution lists that may be used in the execution of the executable form. The component method execution lists may be generated because the components of a model may execute component methods by type (not by component) when the component has a sample hit. The execution engine 760 may repetitively execute the instructions for example, via successive time steps from an execution start time to a stop time specified by the user or until the execution is interrupted.

The execution engine 760 may enable interpretive execution of part or all of the model. Likewise, the execution engine 760 may enable compiled or accelerated execution of part or all of the model. Combinations of interpretive and compiled or accelerated execution may also be enabled by the execution engine 760.

Figure 8:
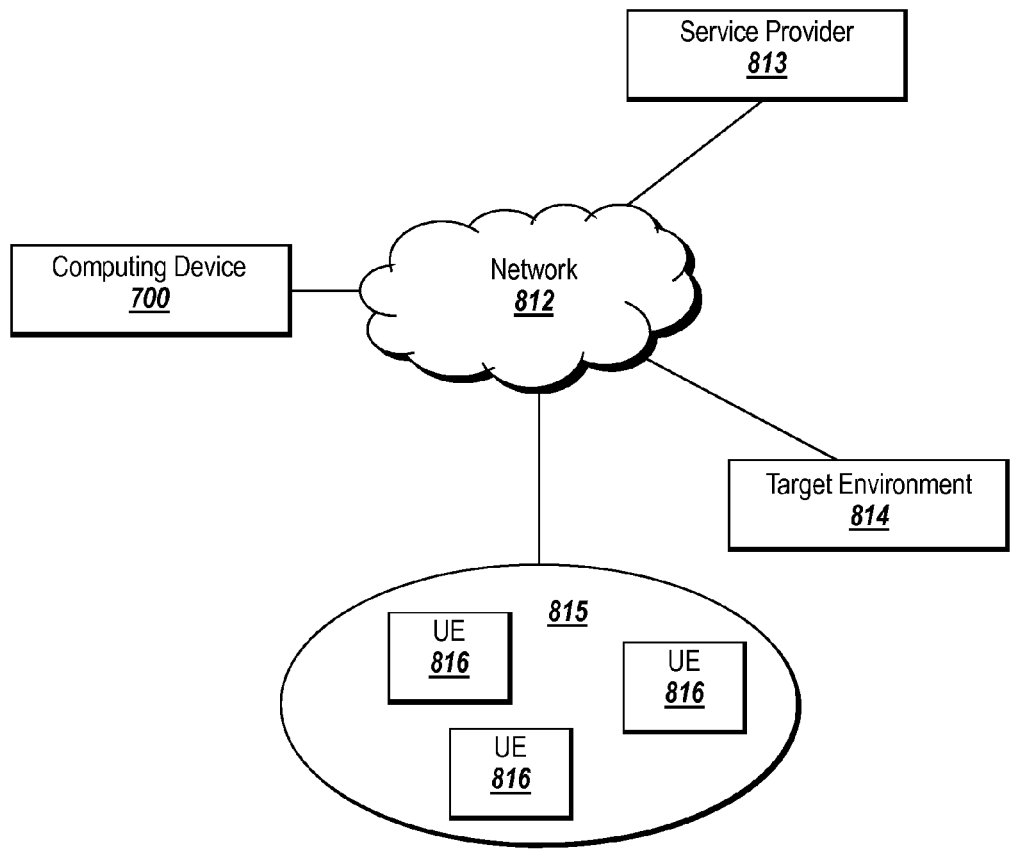
FIG. 8 depicts a network implementation that may be suitable for use with one or more embodiments disclosed herein.

FIG. 8 depicts a network implementation that may implement one or more embodiments of the invention. A system 800 may include a computing device 700 a network 812, a service provider 813, a target environment 814, and a cluster 815. The embodiment of FIG. 8 is exemplary, and other embodiments can include more devices, fewer devices, or devices in arrangements that differ from the arrangement of FIG. 8.

The network 812 may transport data from a source to a destination. Embodiments of the network 812 may use network devices, such as routers, switches, firewalls, and/or servers (not shown) and connections (e.g., links) to transport data. 'Data,' as used herein, may refer to any type of machine-readable information having substantially any format that may be adapted for use in one or more networks and/or with one or more devices (e.g., the computing device 700, the service provider 813, etc.). Data may include digital information or analog information. Data may further be packetized and/or non-packetized.

The network 812 may be a hardwired network using wired conductors and/or optical fibers and/or may be a wireless network using free-space optical, radio frequency (RF), and/or acoustic transmission paths. In one implementation, the network 812 may be a substantially open public network, such as the Internet. In another implementation, the network 812 may be a more restricted network, such as a corporate virtual network. The network 812 may include Internet, intranet, Local Area Network (LAN), Wide Area Network (WAN), Metropolitan Area Network (MAN), wireless network (e.g., using IEEE 802.11, Bluetooth, etc.), etc. The network 912 may use middleware, such as Common Object Request Broker Architecture (CORBA) or Distributed Component Object Model (DCOM). Implementations of networks and/or devices operating on networks described herein are not limited to any particular data type, protocol, architecture/configuration, etc.

The service provider 813 may include a device that makes a service available to another device. For example, the service provider 813 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 814 may include a device that receives information over the network 812. For example, the target environment 814 may be a device that receives user input from the computer 710.

The cluster 815 may include a number of units of execution (UEs) 816 and may perform processing on behalf of the computer 800 and/or another device, such as the service provider 813. For example, the cluster 815 may perform parallel processing on an operation received from the computer 700. The cluster 815 may include UEs 816 that reside on a single device or chip or that reside on a number of devices or chips.

The units of execution (UEs) 816 may include processing devices that perform operations on behalf of a device, such as a requesting device. A UE may be a microprocessor, field programmable gate array (FPGA), and/or another type of processing device. UE 816 may include code, such as code for an operating environment. For example, a UE may run a portion of an operating environment that pertains to parallel processing activities. The service provider 813 may operate the cluster 815 and may provide interactive optimization capabilities to the computer 810 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (also referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

Techniques and embodiments described herein provide users with the ability to create and use canonicalized versions of reuse candidates in many types of usage scenarios.

For example, when multiple people are working on the same state diagram, changes made by a first user to a canonicalized version may be resolved automatically; accordingly, a second user interacting with the canonicalized version or one or more reuse candidates implemented based on the canonicalized version may be presented with the most up-to-date version of the state diagram. Further, propagating the changes between the different users may be performed relatively quickly, so that the disparate changes from two users are not intermingled.

Further, if a user is making changes to a complicated state diagram, the user may wish to test the changes by simulating the state diagram. As a part of simulation, the state diagram may be compiled. If the user makes a change to only a small portion of the state diagram the entire state diagram may be recompiled. Thus, the user must either choose to recompile the entire state diagram for each incremental change or make multiple changes in a batch before recompiling. Using the canonicalized versions described in the present application, only the canonicalized version may be recompiled, thus allowing incremental changes to be quickly implemented and tested.

Changes made to one state in a state diagram may affect code generated for a related state. Thus, if code is certified for a state diagram, the entirety of the code may have to be recertified when minor changes are made to any portion of the code. The canonicalized versions described in the present application may be stored in separate libraries or files, thus allowing for a degree of modularity. So, a change made to one state in a state diagram may not affect code generated for a canonicalized version and the file with the code generated for the canonicalized version may not have to be recertified.

Moreover, a user may write code including a single state or collection of states which are utilized multiple times throughout the model. Using the canonicalized versions of the present application, a user may reuse similar states, even where the states include different parameters, such as variables and constants. As a result, code may be generated based on the canonicalized version (as opposed to multiple copies of the code throughout the model) with fewer redundancies.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. A non-transitory device-readable storage medium storing instructions, the instructions when executed causing one or more processors to perform a process comprising:
   identify one or more reuse candidates in an executable graphical state diagram model, each reuse candidate comprising a subchart of the graphical state diagram model;
   obtain an atomic subchart, the atomic subchart
      being a canonicalized representation of the subcharts of the one or more reuse candidates, and
      comprising restrictions applied to a structure or semantics of the atomic subchart that allow the atomic subchart to be used without relying on parameters outside of the atomic subchart in the graphical state diagram model when the atomic subchart is placed in the graphical state diagram model, and
   replace in the graphical state diagram model, at least one of the reuse candidates with the atomic subchart; the replacing comprising;
   generating a link between the at least one of one or more reuse candidates and the atomic subchart, the link configured to parameterize the atomic subchart.

2. The medium of claim 1, wherein the link is in a form of a table.

3. The medium of claim 1, further storing instructions for storing the link with the graphical state diagram model.

4. The medium of claim 3, further storing instructions for:
   generating code for the graphical state diagram model;
   receiving an indication that one or more of the one or more reuse candidates or the atomic subchart is modified, and
   re-generating code for the one or more of the reuse candidates or the atomic subchart that has been modified, without requiring regenerating code for other parts of the graphical state diagram model.

5. The medium of claim 1, wherein the atomic subchart
   is restricted from accessing data or graphical functions that reside in other states or subcharts of the graphical state diagram model,
   comprises data defined explicitly,
   comprises exported functions called by the atomic subchart,
   comprises data limited to particular types,
   is restricted from event broadcasts which are outside the scope of the atomic subchart,
   makes no use of supertransitions crossing a boundary of the atomic subchart, or
   is restricted from use of execute-at-initialization behavior.

6. The medium of claim 1, further storing instructions for activating the link to replace variables or constants of the atomic subchart with variables and constants from the at least one of the one or more reuse candidates.

7. The medium of claim 1, further storing instructions for replacing all reusable candidates with the atomic subchart.

8. A method comprising: generating code for a graphical state diagram model;
   wherein the graphical state diagram model comprises at least one atomic subchart in place of a reuse candidate, where
      the reuse candidate comprises a subchart of the graphical state diagram model,
      the atomic subchart is a canonicalized representation of the subchart of the reuse candidate, and comprises restrictions applied to a structure or semantics of the atomic subchart that allow the atomic subchart to be used without relying on parameters outside of the atomic subchart in the graphical state diagram model when the atomic subchart is placed in the graphical state diagram model,
      the atomic subchart having an associated parameterized link configured to parameterize the atomic subchart to provide information related to the reuse candidate;
   receiving an indication that the reuse candidate or the atomic subchart is modified,
   regenerating code for the reuse candidate or the atomic subchart that has been modified, without requiring regenerating code for the other parts of the graphical state diagram model.

9. The method of claim 8, wherein the generating code comprises generating code based on the parameterization link.

10. The method of claim 8, wherein the atomic subchart
    is restricted from accessing data or graphical functions that reside in other states or subcharts of the graphical state diagram model,
    comprises data defined explicitly,
    comprises exported functions called by the atomic subchart,
    comprises data limited to particular types,
    is restricted from event broadcasts which are outside the scope of the atomic subchart,
    makes no use of supertransitions crossing a boundary of the atomic subchart, or
    is restricted from use of execute-at-initialization behavior.

11. The method of claim 8, further comprising:
    activating the link to replace variables or constants of the atomic subchart with variables and constants from the at least one of the one or more reuse candidates.

12. The method of claim 8, further comprising:
replacing all reusable candidates with the atomic subchart.

13. A system comprising:
a storage for storing an executable graphical state diagram model that is a single statechart; and
one or more processors programmed to:
identify one or more reuse candidates in an executable graphical state diagram model, each reuse candidate comprising a subchart of the graphical state diagram model;
obtaining an atomic subchart, the atomic subchart
being a canonicalized representation of the subcharts of the one or more reuse candidates, and
comprising restrictions applied to a structure or semantics of the atomic subchart that allow the atomic subchart to be used without relying on parameters outside of the atomic subchart in the graphical state diagram model when the atomic subchart is placed in the graphical state diagram model, and
replace in the graphical state diagram model, at least one of the reuse candidates with the atomic subchart; the replacing comprising;
generating a link between the at least one of one or more reuse candidates and the atomic subchart, the link being configured to parameterize the atomic subchart.

14. A method performed by one or more processors, comprising:
identifying one or more reuse candidates in an executable graphical state diagram model, each reuse candidate comprising a subchart of the graphical state diagram model;
obtaining an atomic subchart, the atomic subchart
being a canonicalized representation of the subcharts of the one or more reuse candidates, and
comprising restrictions applied to a structure or generating of the atomic subchart that allow the atomic subchart to be used without relying on parameters outside of the atomic subchart in the graphical state diagram model when the atomic subchart is placed in the graphical state diagram model, and
replacing in the graphical state diagram model, at least one of the reuse candidates with the atomic subchart; the replacing comprising;
generating a link between the at least one of one or more reuse candidates and the atomic subchart, the link configured to parameterize the atomic subchart.

15. The method of claim 14, wherein the link is in a form of a table.

16. The method of claim 14, further comprising:
storing the link with the graphical state diagram model.

17. The method of claim 16, further comprising:
generating code for the graphical state diagram model;
receiving an indication that one or more of the one or more reuse candidates or the atomic subchart is modified, and
regenerating code for the one or more of the reuse candidates or the atomic subchart that has been modified, without requiring regenerating code for other parts of the graphical state diagram model.

18. A non-transitory device-readable storage medium storing instructions, the instructions, the instructions when executed causing one or more processors to perform a process comprising:
generate a code for a graphical state diagram model;
wherein the graphical state diagram model comprises at least one atomic subchart in place of a reuse candidate, where
the reuse candidate comprises a subchart of the graphical state diagram model,
the atomic subchart is a canonicalized representation of the subchart of the reuse candidate, and comprises restrictions applied to a structure or semantics of the atomic subchart that allow the atomic subchart to be used without relying on parameters outside of the atomic subchart in the graphical state diagram model when the atomic subchart is placed in the graphical state diagram model,
the atomic subchart having an associated parameterized link configured to parameterize the atomic subchart to provide information related to the reuse candidate;
receive an indication that the reuse candidate or the atomic subchart is modified,
regenerate code for the reuse candidate or the atomic subchart that has been modified, without requiring regenerating code for the other parts of the graphical state diagram model.

* * * * *